July 12, 1938.  A. C. VIGUERIE, JR  2,123,388
COMBINED SPRING AND STEERING MECHANISM
Filed April 27, 1937   2 Sheets-Sheet 1

Inventor
Arthur C. Viguerie Jr.
By Edward V. Hardway
Attorney

July 12, 1938.  A. C. VIGUERIE, JR  2,123,388
COMBINED SPRING AND STEERING MECHANISM
Filed April 27, 1937  2 Sheets-Sheet 2

Inventor
Arthur C. Viguerie Jr.
By
Edward V. Hardway
Attorney

Patented July 12, 1938

2,123,388

UNITED STATES PATENT OFFICE 2,123,388

COMBINED SPRING AND STEERING MECHANISM

Arthur C. Viguerie, Jr., Pasadena, Tex.

Application April 27, 1937, Serial No. 139,167

4 Claims. (Cl. 280—96.2)

This invention relates to a combined spring and steering mechanism.

An object of the invention is to provide a novel type of vehicle steering mechanism which embodies also novel spring means for supporting the forward end of the vehicle chassis. The invention also embodies check means for checking the rebound.

It is another object of the invention to provide independent springs for supporting the forward end of the chassis on the steering wheels whereby either steering wheel may, upon encountering an obstruction, yield upwardly relative to the chassis whereby the transmission of shocks to the chassis and the body will be minimized.

It is a further object of the invention to provide spring and check means of the type described which will be completely enclosed.

With the above and other objects in view, the invention has particular relation to certain novel features of construction, operation and arrangement of parts, an example of which is given in this specification and illustrated in the accompanying drawings, wherein.

Figure 1:
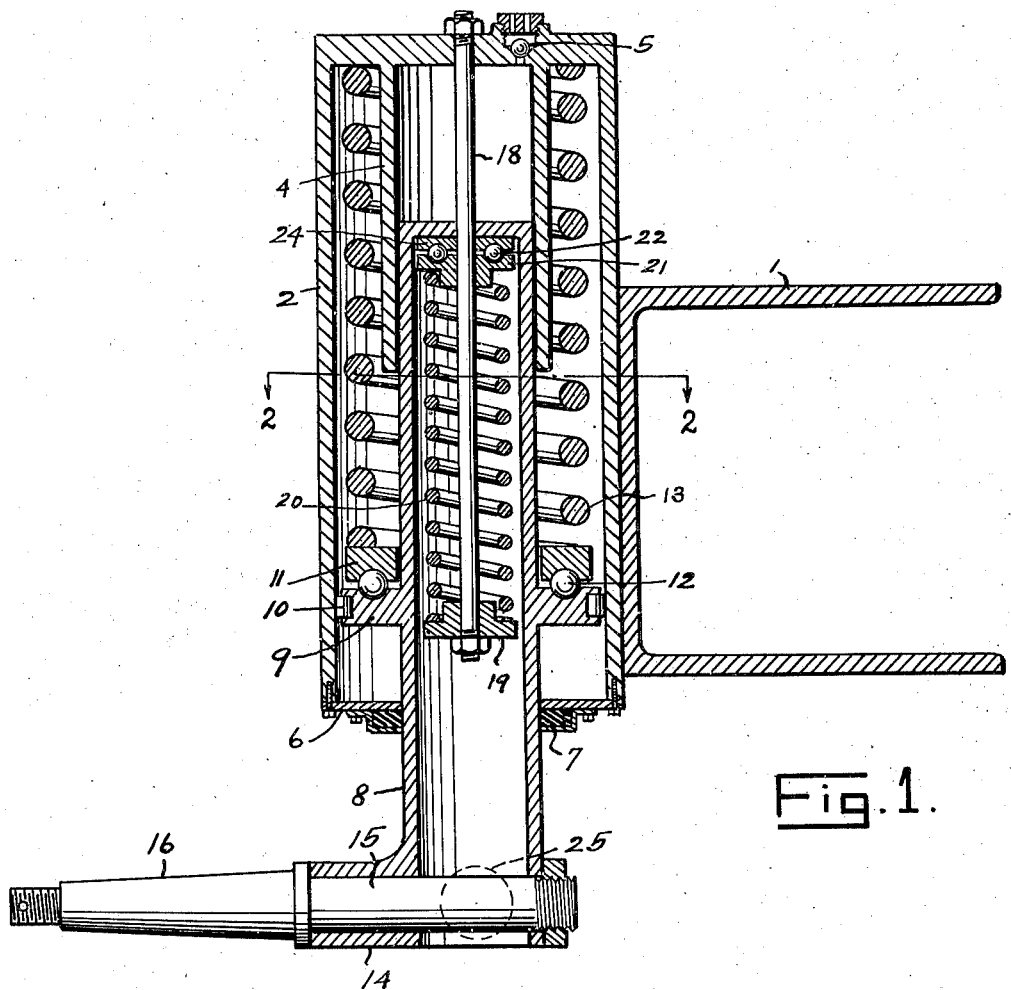
Figure 1 shows a vertical sectional view showing the wheel spindle and the means for supporting the chassis thereon.
Figure 2:
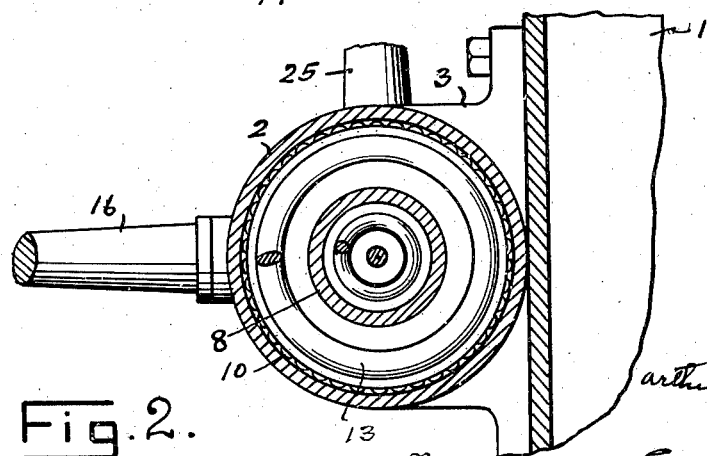
Figure 2 shows a cross sectional view taken on the line 2—2 of Figure 1.
Figure 3:
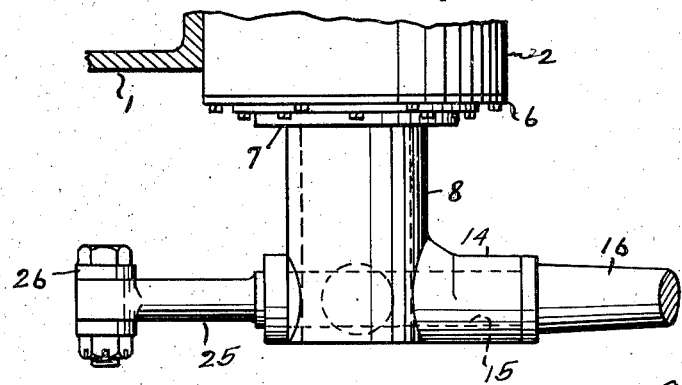
Figure 3 shows a fragmentary front elevational view.
Figure 4:
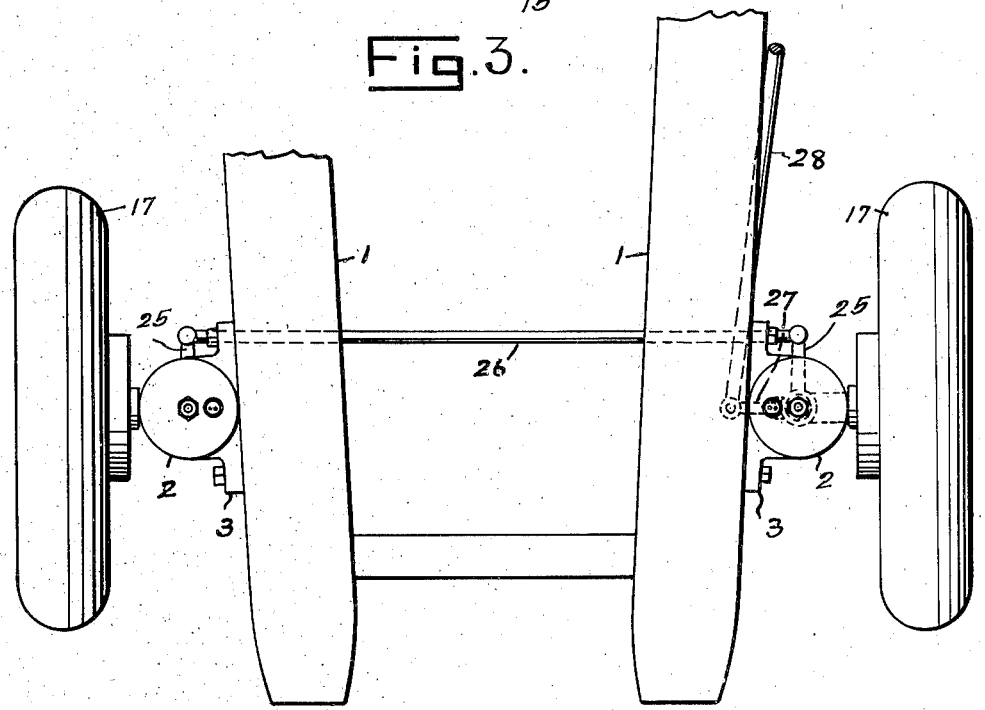
Figure 4 shows a fragmentary plan view showing the forward end of the vehicle.

Referring now more particularly to the drawings wherein like numerals of reference designate the same parts in each of the figures, the numerals 1, 1 designate the side members of the vehicle frame or chassis.

Secured to these respective side members, at their forward ends, are the inverted cylindrical housings 2, 2 which are secured to said side members by suitable brackets 3, 3. The upper ends of the housing are closed and depending from said upper ends, into the housing, are the cylinders 4. The outer ends of these cylinders are equipped with outlet check valves 5. The lower ends of the housings are closed by the end plates 6 which are equipped with stuffing boxes 7. There are the hollow shafts 8 which work through the stuffing boxes 7 and whose upper ends fit closely into the cylinders 4 and are closed. Each shaft 8 has an annular outwardly extended flange 9 forming a spring support. The margin of each flange 9 may be equipped, if desired, with antifriction rollers 10, which work against the inside wall of the corresponding housing 2.

Supported on each flange 9 there is a bearing ring 11 which surrounds the shaft 8 and which rides on the antifriction rollers 12. A strong coil spring 13 surrounds the cylinder 4 and shaft 8 and is interposed between the housing and the supporting ring 11 whereby to support the housing and the corresponding frame member 1 yieldingly relative to the shaft 8.

The lower end of each shaft 8 has an outwardly extending sleeve 14 and an axle 15 is fitted through said sleeve and secured to the corresponding shaft 8. The outer end of each axle 15 is formed into a wheel spindle 16 whereon the steering wheels 17, 17 are rotatably mounted in the usual way. Each steering wheel, upon encountering an obstruction, may yield upwardly placing the spring 13 under compression without any considerable shock being transmitted to the corresponding frame 1.

There is an axial rod 18 whose upper end is secured to the upper end of the corresponding housing 2. This rod extends downwardly through a central bearing in the upper end of the corresponding shaft 8 and its lower end has a supporting plate 19 resting thereon.

A coil spring 20 is confined within the shaft 8 and surrounds the rod 18 and is supported on the plate 19. The upper end of this spring 20 supports the upper bearing plate 21 which is mounted thereon and which rides against the antifriction bearings 22 thereabove which in turn ride in the groove of the plate 24 which is located against the upper end of the shaft 8. Upon rebound the spring 20 serves as a check for absorbing the shock of the rebound.

Upon upward movement of the shaft 8 the air in the cylinder 4 above will be forced out past the check valve 5. Upon downward movement of the shaft 8 the check valve 5 will close causing a partial vacuum to be created in the cylinder 4 to additionally check the rebound.

The lower end of each shaft 8 has a rearwardly extending steering arm 25 fixed thereto, said steering arms being connected by the transverse steering rod 26.

One of the shafts 8 has an inwardly extended arm 27, to the inner end of which the link 28 is pivotally connected, said link being longitudinally shiftable by means of the conventional steering shaft of the vehicle. The steering wheels may thus be guided in accordance with the will of the driver.

The drawings and description disclose what is now considered to be a preferred form of the invention by way of illustration only, while the broad principle of the invention will be defined by the appended claims.

What I claim is:—

1. Combined spring and steering mechanism comprising housings connected to the side members of a vehicle chassis, a vertical rotatable shaft in each housing, means for confining the shaft to approximately vertical movement in the housing, an external support on each shaft, yieldable means supporting the housing on the corresponding shaft support, a rod connected to the top of the cylinder and extended into the shaft, a coil spring mounted on said rod, abutments on the shaft and rod between which the spring is confined, a wheel spindle on each shaft, a steering wheel on each spindle, means for simultaneously rotating the shafts for steering the wheels.

2. In spring and steering mechanism a housing, a cylinder therein forming a guide, a shaft whose upper end is in said cylinder and forms a close fit therewith, an external annular support on the shaft within the housing, a spring within the housing and supporting the housing on said support, a wheel spindle fixed to and extending laterally from the shaft, a rod connected to the upper end of the cylinder and extended into the shaft, and an abutment on the lower end of said rod, a coil spring around the rod supported on said abutment and checking the rebound of the housing.

3. Combined spring and steering mechanism comprising housings connected to the side members of the chassis of a motor vehicle, a cylinder in each housing, a shaft extending into each cylinder, an external flange on each shaft within the housing, a spring supporting each housing and supported on the corresponding flange, a rod connected to the upper end of each cylinder and extended into the corresponding shaft, an abutment on the lower end of each rod, a coil spring surrounding each rod and supported on the corresponding abutment and checking the rebound movement of the corresponding housing, a wheel spindle on the lower end of each shaft, a steering wheel on each spindle and means for simultaneously rotating the shafts in the same direction to steer said wheels.

4. In a spring and steering mechanism a housing, a guide within said housing, a shaft movable within said guide, an external flange on said shaft, a coil spring surrounding said shaft and guide and supporting said housing, said spring being supported on the said flange, a rod connected to the upper end of said housing and extending into said shaft, an abutment on the lower end of said rod, a coil spring surrounding said rod and supported on said abutment for checking the rebound of said housing and a wheel spindle on the lower end of said shaft.

ARTHUR C. VIGUERIE, Jr.